Feb. 26, 1952     R. H. MARSHALL     2,586,840
MOTION RECORDER FOR TORPEDO CONTROLS

Filed Aug. 13, 1948     2 SHEETS—SHEET 1

Inventor
*R. H. Marshall*
By *M. Hayes*
Attorney

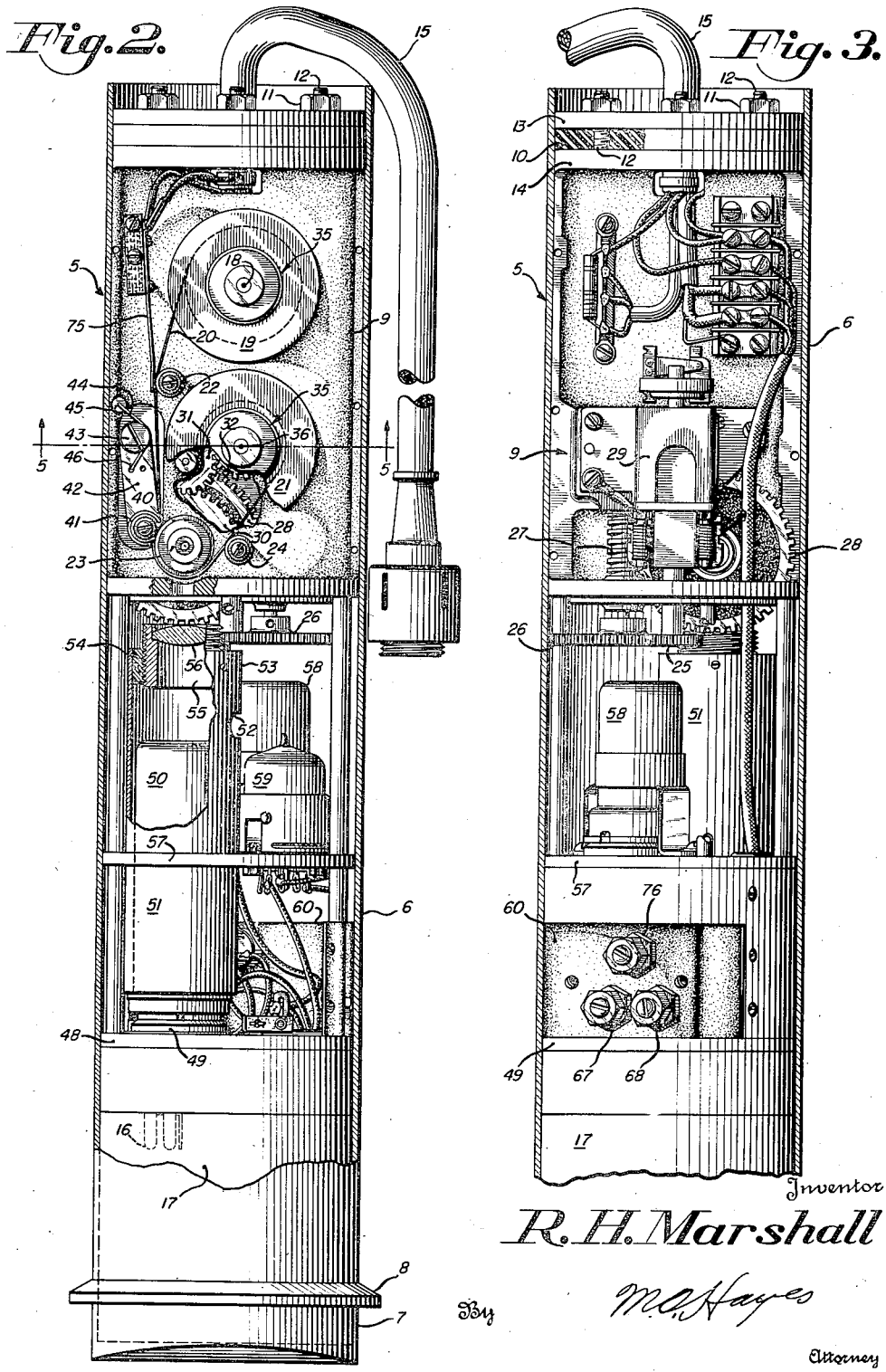

Patented Feb. 26, 1952

2,586,840

UNITED STATES PATENT OFFICE 2,586,840

MOTION RECORDER FOR TORPEDO CONTROLS

Robert H. Marshall, Washington, D. C.

Application August 13, 1948, Serial No. 44,209

7 Claims. (Cl. 346—38)

(Granted under the act of March 3, 1883, as amended April 30, 1928; 370 O. G. 757)

This invention relates generally to recording instruments and more particularly to a device of this character adapted to measure and record the motion of moving parts of a mechanism such, for example, as the controls of a torpedo during the travel of the torpedo through the water.

Heretofore, very little was known of the behavior of the rudder and other controls of a torpedo in response to the roll, pitch, or yaw of the torpedo as it moves through the water. Theoretically the controls assume certain positions responsive to certain torpedo movements; this theory, however, was based entirely upon the end results of the torpedo run rather than upon an exact knowledge of the behavior of the controls during the run. Whether the controls were sluggish in their response to their correcting mechanism or whether they were inclined to overtravel when corrected remained substantially unknown. The various instruments heretofore used in an effort to obtain this information have employed inertia responsive indicating elements of various kinds and for this reason have usually been too susceptible to vibration or sudden changes in acceleration incidental to the normal operation of a torpedo to render them suitable for providing information of the accuracy required.

According to the arrangement of the present invention the difficulties heretofore encountered in the use of the prior art apparatus are obviated by providing a new and improved motion recorder constructed and arranged for mounting within the handhole of a torpedo and having in lieu of an inertia responsive indicating element the electron beam of a cathode-ray oscillograph tube, the tube being arranged within a circuit effective to cause a deflection of the beam on the screen of the tube proportional to the movement of the control under test, the recorder also having a constant speed film arranged to run for a predetermined interval sufficient to record on the film the beam deflections corresponding to the desired information whereby a time history of the movement of the control is obtained.

An object of the present invention is to provide a new and improved motion recorder relatively insensitive to shock and sudden changes in acceleration of the torpedo part to be tested.

A further object is to provide a new and improved motion recorder adapted for mounting within the handhole of a torpedo whereby a recording is made on a moving film of the movement of any chosen part of a torpedo control mechanism during the course of the torpedo run through the water.

A still further object is to provide an improved motion recorder adapted to record on a moving film the deflections of an electron beam produced by a cathode-ray tube in response to variable signals from a signal source operatively connected to a part of the torpedo to be tested.

An additional object is to provide a motion recorder adapted to be automatically put in operation as the torpedo is discharged from the launching tube.

A still further object is to provide a motion recorder wherein the high voltage circuits of the device are controlled by a diode vacuum tube that becomes conductive as the filament of the tube is heated after the closing of the starting switch.

Another object is to provide a motion recorder adapted to be deenergized at the completion of a recording cycle.

Additional objects, features and advantages of the present invention are those residing in and relating to the novel construction and arrangement of the elements thereof, as will more clearly appear from the following description reference being now made to the accompanying drawings wherein like reference characters will refer to like parts throughout the several views of which:

Fig. 2 is a view partly in section and partly in elevation of the motion recorder;

Fig. 3 is a view partly in section and partly in elevation of the recorder rotated 180° from the view shown in Fig. 2;

Figure 1:
Fig. 1 is a schematic view of the recorder as arranged within the handhole of a torpedo.

Referring now to the drawings and more particularly to Figs. 2 and 3 thereof, the motion recorder generally designated 5 is shown arranged within a cylindrical casing 6 the normally closed end 7 thereof being equipped with an external flange portion 8 whereby the recorder may be secured in a conventional manner within the handhole of a test torpedo as schematically illustrated in Fig. 1.

The amplifying and recording elements of the apparatus are mounted upon a chassis structure 9 that is adapted to telescope within the open end of the casing and secured therein as by an expansible washer 10. This washer may be formed from any suitable resilient material such, for example, as "neoprene," that is caused to expand outwardly to frictionally grip the wall of the casing, for hermetically sealing the mechanism therein, by tightening nuts 11 and upon stud screws 12 thereby compressing the resilient washer 10 between the movable plate 13 and the flat end 14 of the chassis. Compression of the washer in this manner also causes it to expand inwardly to form a seal about the electrical cable 15 by which signals are supplied from the signal source to the recorder.

Terminal pins 16 extending from the lower end of the chassis are connected with the various batteries of the device, enclosed within the housing 17, as the chassis is lowered in place within the casing.

Rigidly secured to the chassis in any suitable manner is a fixed stud member 18 over which is rotatably mounted a film supply reel 19. Wound about this reel is a quantity of sensitized film 20 that is communicated, during the operation of the device, to a motor driven takeup reel 21 after having first passed around an idler spool 22, a constant speed film driving drum 23 and a second idler spool 24, the idlers being stud supported on the chassis. A series of engaging gears 25, 26, 27, and 28 are arranged to drive the drum 23 from the shaft of motor 29 that is of any suitable constant speed type such, for example, as that manufactured by "Delco order #X-160690."

Figure 5:
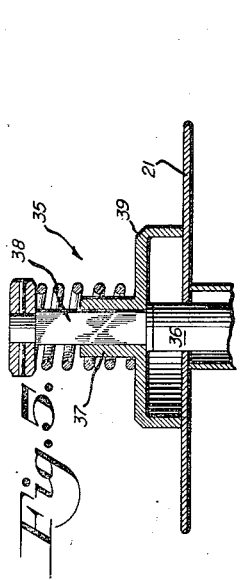
Fig. 5 is a view in section of the clutch assembly as taken along line 5—5 of Fig. 2.

The spur gear 30 secured to and forming part of gear 28, is operative through it associated gears 31 and 32 to rotate the takeup reel 21 at a speed slightly in excess of that of the driving drum 23, whereby the film will be taken up by the reel as it is discharged from the drum. A simple spring driven clutch assembly generally designated 35, as illustrated in detail in Fig. 5, provides a frictional connection between the shaft 36 and the takeup reel 21 whereby the reel is permitted to rotate at a speed different from that of the shaft as the film is supplied thereto upon leaving the driving drum 23. The butt plate 37 of the clutch, by reason of its connection with the square portion 39 of the shaft is rotated with the shaft and connects with the reel only by frictional contact with the outer surface thereof through the edge of flange 39. Shaft 36 is rotatably supported on the chassis 9 in suitable journals, not shown, the clutch and reel being located on one side of the chassis and driving gear 12 therefor on the other, as may be seen in Figs. 2 and 3, the chassis being partially broken away in Fig. 2 for the purposes of illustrating this arrangement.

A similar clutch arrangement is provided for applying a drag upon reel 19, the plate 37 of the clutch by reason of its connection with the squared portion of the fixed stud 18, is prevented from rotating with the reel as the film is drawn therefrom by the rotation of drum 23. Therefore overtravel and possible loosening and fouling of the film is prevented as it moves through the device.

The constant speed drum 23 is equipped with a rubber outer sleeve 40 whereby frictional contact is made with the film as it is drawn by the drum from the supply reel 19. To further insure a positive connection between the drum and film, an idler roller 41 is arranged to press the film to the surface of the drum by a conventional belt tightener assembly including an arm 42 pivotally connected to the chassis at 43 and supporting at its free end the roller 41. A torsion spring 44 is connected to the chassis at 45 for urging the roller equipped end of an arm in the direction of the drum by its connection with the arm at 46.

Figure 4:
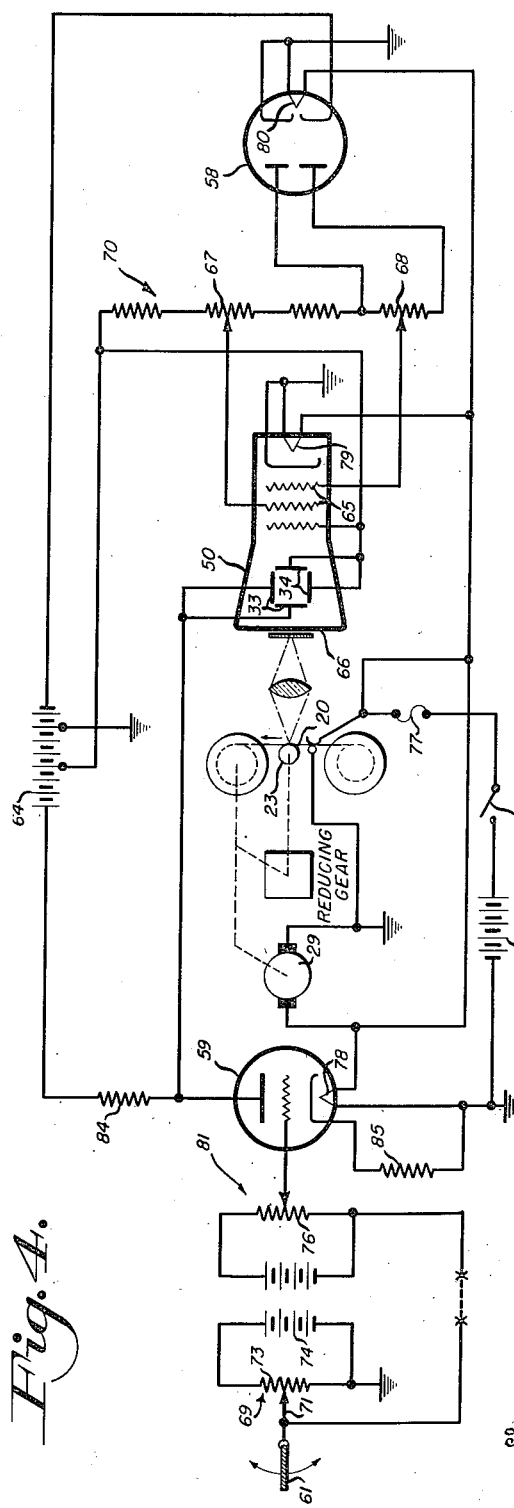
Fig. 4 is a schematic view of the electrical system of the present invention.

Mounted within a partition 48 of the chassis is a socket member 49 adapted for receiving the base contacts of a cathode-ray tube 50 which may be of any suitable type such, for example, as that manufactured by R. C. A. #913. The tube is rotatively oriented about its longitudinal axis so that the deflection plates 33 and 34 thereof, Fig. 4, make an angle of approximately 45° to the longitudinal center line of the film. Thus, when the plates are electrically connected in pairs, as illustrated in the circuit diagram of Fig. 4, the only deflection of the beam thereafter possible is in a direction perpendicular to the center line of the film. This arrangement increases the sensitivity of the tube by approximately 3 decibels. The time sweep is provided of course, by the constant speed motion of the film through the instrument. Telescoped over the cathode-ray tube in the manner illustrated, and secured to the chassis in any suitable manner, is a preferably metallic cylinder 51 within which is provided a suitable opening 52 through which the screen of the cathode-ray tube may be viewed for proper focusing and adjustment of the electron beam thereagainst. Secured within the end of cylinder 51, as by screws 53, is a preferably fiber sleeve 54 suitably threaded along its inner surface for connecting with the threaded surface of a lens retaining member 55 within which is secured, as by cement, a lens 56 suitable for focusing the image appearing on the screen of the tube to the surface of film 20 as it passes around the drum 23. Focusing of the lens is accomplished by rotation of sleeve 55 within its threaded connection with sleeve 59, the fibrous character of the sleeve serving to frictionally bind with the lens retaining member thereby to retain it in a proper position of adjustment.

Secured in a conventional manner to partition 57 of the chassis are vacuum tubes 50 and 59. Their arrangement in the electrical circuit of the device and their relation to other elements thereof such as those concealed beneath the cover plate 60 in Figs. 2 and 3, will become more clearly apparent by referring to Fig. 4 which shows a schematic circuit diagram of the device as connected to the part of the torpedo to be tested, which in the present instance, is one of the torpedo steering rudders 61.

The recorder is put in operation upon the closing of switch 62 which may be accomplished in any suitable manner as by hydrostatic pressure as the torpedo moves through the water or by a mechanical trip as the torpedo is discharged from the launching tube. The closing of this switch starts the film moving through the instrument by connecting the film driving motor 29 with battery 63 and concurrently therewith connects the battery to the filaments of tubes 58, 59, and 60, simple and obvious circuits being employed for this purpose.

Figure 6:
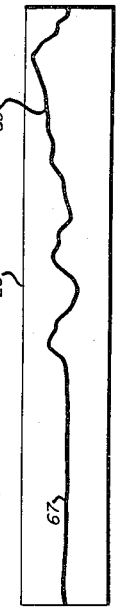
Fig. 6 is a section of film as taken from the recorder and showing the electron beam deflections of the cathode-ray tube in response to movement of the test part operatively associated therewith.

As the filament of the convention dual diode tube 58 is energized, the tube, which in the present instance is used as a switch, begins to pass current from the B-battery supply 64 through the voltage divider network generally designated 70 that is employed to supply operating voltage of optimum values to the grids 65 of the cathode-ray tube thereby concentrating the electron beam therethrough as a point or spot upon the fluorescent screen 66 of the tube where it becomes visible to the recording film 20 passing over the drum 23. The undeflected spot of the beam is recorded on the film in the form of a line running substantially coincident with, or parallel to, the longitudinal center line of the film, as illustrated at 67 in Fig. 6, the spot of the beam being deflected from the center line of the film, as shown at 69 in Fig. 6, when the cathode-ray tube responds to a signal applied thereto, as hereinafter more fully to appear. The focusing and intensity of the beam are respectively controlled by potentiometers 67 and 68 arranged within the aforesaid conventional voltage divider circuit 70 that connects the B-battery supply to the grids of the cathode-ray tube.

The signal source in the present instance is a potentiometer generally designated 69 of which the wiper arm 71 thereof, by reason of its connection with the part to be tested such, for example, as the rudder 61, is caused to move across the resistance winding 73 responsive to the motion of the rudder, thereby to vary the voltage drop between the wiper 71 and ground potential. This voltage drop is derived from battery 74 and applied to the control grid of the triode amplifier tube 59 which is supplied from battery 64 and includes resistors 84 and 85 in the anode-cathode circuit of the tube.

A grid bias generally designated 81 is connected in the grid circuit of tube 59 and includes a potentiometer 76 whereby an initial bias may be applied to the grid for centering the beam from the cathode-ray tube upon the recording film. As the grid becomes more or less positive with respect to the cathode of the tube upon variation of the voltage drop across resistance 73 as the rudder moves, conductivity of the tube changes to vary the voltage potential applied across the deflection plates of the cathode-ray tube 50 from the anode of tube 59, thereby deflecting the beam of the tube in direct proportion to the rudder movement.

To those skilled in the art it will be apparent from the aforedescribed structure that with proper auxiliary equipment such, for example, as a motor driven commutator arranged, during rotation, to intermittently connect in substitution for the grid bias 81 other such biases of different values for the purpose of shifting the beam position upon the recording film and simultaneously therewith to connect with these respective grid biases in substitution for the signal source 69 other such input signal sources respectively connected to other control parts of the torpedo to be tested, it is possible therewith to record concurrently on a single strip of 16 mm. film, as many as five distinct signal traces.

At the completion of the recording cycle, which occurs as the film is exhausted from the supply reel 19, a switch 75, that is normally retained in open circuit position with a roller 22 by the presence of the film 20 therebetween, is caused to ground across the roller, thereby connecting the battery 63 across a fuze strip 77 to cause the fuze to rupture and open the circuit to the film driven motor and tube filaments 78, 79, and 80. The cooling of filament 80, as heretofore described, causes the tube 59 to discontinue passing current thereby disconnecting the B-battery supply from the grids of the cathode-ray tube 50.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent is:

1. A motion recorder system for use in a running torpedo to measure and record the motion of a control part thereof comprising, in combination, a variable signal source attached to said control part for producing a variable signal voltage proportional to the movement of said part, means including a cathode-ray tube having a pair of electrodes therein electrically connected to said signal source whereby a change in the signal voltage applied to the electrodes effects a deflection of the electron beam of the tube proportionally to variations in the signal voltage thereby to produce a visual signal on the screen of the tube indicative of the movement of said part when the tube is set in operation, means including a moving film and constant speed driving means therefor for producing a photographic record of said visual signal when the film has been set in motion thereby to provide a time history of the movement of said control part during the run of the torpedo through the water, and means for concurrently setting said tube and film driving means in operation as the torpedo is launched within the water.

2. A motion recorder system of the character disclosed adapted for use in a running torpedo to measure and record the movement of a torpedo part during the run of the torpedo through the water comprising, in combination, a housing adapted to fit within the handhole of the torpedo, a chassis arranged within said housing, a cathode-ray tube having a fluorescent screen thereon arranged on said chassis and adapted to generate an electron beam and impinge said beam on said screen for producing a visible signal thereon when the tube is set in operation, a pair of electrodes arranged within said tube and adapted in response to predetermined voltages applied thereacross to deflect the beam proportionally to the amplitude of the voltages, a variable signal source, means operatively connecting said signal source to said torpedo part whereby a signal voltage is produced by the signal source proportional to the movement of said part, a circuit for applying said signal voltage to the deflection plates of said tubes, a photographic means including a length of film movable transversely to the screen of said tube, constant speed driving means for said film, an optical system including a lens adapted to focus the visual signal appearing on the screen against the surface of said film for recording thereon said deflection of the beam, said constant speed film comprising a time sweep for said beam thereby producing a recording of the movement of said part with respect to the time of occurrence thereof, and means for setting said tube and said film driving means in operation as the torpedo is launched.

3. A motion recorder system of the character disclosed adapted for use in a running torpedo to measure and record movement of the torpedo rudder during the run of the torpedo through the water comprising, in combination, a cylindrical casing adapted to fit within the handhole of a torpedo, a plug for sealing said casing, a chassis structure mounted on said plug and adapted to be secured within the casing by the attachment of said plug thereto, a cathode-ray tube mounted on said chassis having a fluorescent screen thereon and adapted to generate an electron beam and impinge said beam on said screen thereby to produce a visual signal thereon when the tube is set in operation, a pair of deflection plates in said tube for causing a deflection of said beam proportionally to the amplitude of voltage applied thereacross, a variable signal source operatively connected to said rudder and adapted to apply a voltage to said plates proportional to the movement of the rudder, photographic means including a length of film movable transversely to the screen of said tube, constant speed driving means for said film, an optical system including a lens adapted to focus the visual signal appearing on the screen against the surface of said film for recording of a visual signal indicative of the movement of the rudder with respect to the time occurrence thereof, and means for setting said tube and film driving means in operation as the torpedo is launched.

4. A motion recorder system of the character disclosed adapted for use in a running torpedo to measure and record movement of the torpedo rudder during the run of the torpedo through the water comprising, in combination, a signal source including a resistance element having a voltage drop thereacross, a wiper arm operatively associated with said rudder and movable thereby across said element thereby to vary the voltage appearing between said wiper arm and one end of said resistance element proportionally to the movement of said rudder, a cathode-ray tube having a fluorescent screen thereon and adapted to generate an electron beam and impinge said beam on said screen for producing a visible signal thereon when the tube is set in operation, a pair of deflection plates arranged within said tube and operatively connected to said signal source so as to be responsive to said voltage between said wiper and resistance element thereby to deflect the beam through said tube proportionally to the variations in said voltage, photographic means including a length of film movable transversely to the screen of said tube, constant speed driving means for said film, an optical system including a lens adapted to focus the visual signal appearing on the screen against the surface of said film for recording thereon said deflection of said beam, said constant speed film comprising a time sweep for said beam thereby to produce a recording of the movement of the rudder under test with respect to the time occurrence thereof, and means for setting said tube and said driving means in operation as the torpedo is launched.

5. A motion recorder system of the character disclosed adapted for use in a running torpedo to measure and record movement of the torpedo rudder during the run of the torpedo through the water comprising, in combination, a cylindrical casing adapted to fit within the handhole of the torpedo, a plug for sealing said casing when attached thereto, a chassis structure mounted on said plug and adapted to be secured within the casing by the attachment of said plug thereto, a cathode-ray tube mounted on said chassis having a fluorescent screen thereon and adapted to generate an electron beam and impinge said beam on said screen for producing a visual signal thereon when the tube is set in operation, a pair of deflection plates in said tube for causing a deflection of said beam proportionally to the amplitude of a voltage applied thereacross, a variable signal source including a potentiometer attached to the rudder to be tested and adapted to produce a variable signal voltage proportional to the movement of the rudder, circuit means including an amplifier for applying said signal voltage to said deflection plates for causing deflection of said beam proportionally to the variations of the signal voltage when the amplifier is set in operation, means supported on said chassis structure and effective when set in operation for photographically recording the deflections of said beam including a length of sensitized film movable in face adjacency to the screen of said tube and transversely to the direction of deflection of said beam, constant speed driving means for said film whereby the recording is interpretive of the rudder movements with respect to the times of occurrence thereof during the torpedo run, and means for setting said cathode-ray tube, amplifier, and recording means in operation as the torpedo is launched.

6. A motion recorder system of the character disclosed adapted for use in a running torpedo to measure and record the movement of the torpedo rudder during the run of the torpedo through the water comprising, in combination, a cylindrical casing adapted to telescope within a handhole in the torpedo, an opening provided in said casing, a closure for said opening, a chassis fixedly secured to said closure and adapted to be secured within said casing as the closure is connected thereto, a cathode-ray tube arranged on said chassis having a fluorescent screen thereon and adapted to generate an electron beam and impinge said beam on said screen thereby to produce a visual signal thereon when the tube is operated, a pair of deflection plates arranged within said cathode-ray tube and adapted to deflect said beam proportionally to the voltage applied across the plates, a variable signal source including a potentiometer attached to the rudder and adapted to generate a signal voltage variably in accordance with the movement of the rudder, a circuit for connecting said signal source to the deflection plates of the tube so as to apply said signal voltage thereto, an amplifier arranged in said circuit for intensifying said signal voltage therein when the amplifier is set in operation, means for photographing said visual signal including a movable film arranged to move transversely of the screen, driving means for said film including a constant speed motor and driving connections therefrom for causing said film to move past the screen at a constant speed, and means including a switch arranged to be closed as the torpedo is launched for setting the cathode-ray tube, amplifier, and photographing means in operation as the switch closes and a second switch operatively associated with said film and arranged to be opened and stop operation of the recorder when the recording cycle is completed.

7. A motion recorder of the character disclosed for measuring and recording the movement of a torpedo control part during the run of the torpedo through the water comprising, in combination, a heater type cathode-ray tube having a screen and interconnected vertical and horizontal deflection plates, circuit means for causing the tube to produce a visual signal on said screen variably in accordance with the voltage applied to said deflection plates, photographic apparatus including a length of film arranged to be moved transversely of the screen of the tube thereby to produce on the film a photographic record of said visual signal, said apparatus comprising means including a constant speed motor for moving said film past said screen at a constant speed thereby to provide a time reference for the recorded signal, means for supporting the tube and photographic apparatus within a handhole of the torpedo with the tube oriented with respect to the film so that the visual signal on the screen appears as a line extending at right angles to the longitudinal center line of the film when a voltage is applied across said deflection plates, a variable signal source connected to said control part and adapted to produce a signal voltage variably in accordance with the movement of said part, means including a heater type amplifier tube for applying said signal voltage to the deflection plates, said last named means also including a variable bias for said amplifier tube and settable at will so as to adjust the visual signal with respect to the center line of the film, circuit means including a heater type diode for applying operating voltages to the control electrodes of the cathode-ray tube when the heater of the diode has become heated sufficiently to render the diode conducting, and circuit means including a switch arranged to be closed as the torpedo is launched into the water for establishing heater circuits to the heaters of the tubes and an energizing circuit to said motor, said last named circuit means also including a switch operatively associated with the film and arranged to interrupt said heater and motor energizing circuits when all of said film has moved past the screen.

ROBERT H. MARSHALL.

REFERENCES CITED

The following references are of record in the file of this patent:

UNITED STATES PATENTS

| Number | Name | Date |
| --- | --- | --- |
| 1,330,898 | O'Neil | Feb. 17, 1920 |
| 1,484,125 | Frazer | Feb. 19, 1924 |
| 2,185,373 | George | Jan. 2, 1940 |
| 2,246,168 | Dome | June 17, 1941 |
| 2,261,309 | Stuart | Nov. 4, 1941 |
| 2,413,785 | Robinette | Jan. 7, 1947 |
| 2,416,276 | Ruge | Feb. 18, 1947 |
| 2,455,963 | Wheeler | Dec. 14, 1948 |

OTHER REFERENCES

"Photography of Underwater Explosion, 1," Navord Report 9–47, published March 24, 1947, by Dept. of Navy, Bureau of Ordnance, pp. 2–6.